G. V. ANDREW.
MILKING MACHINE.
APPLICATION FILED MAY 7, 1917.
1,270,091.
Patented June 18, 1918.
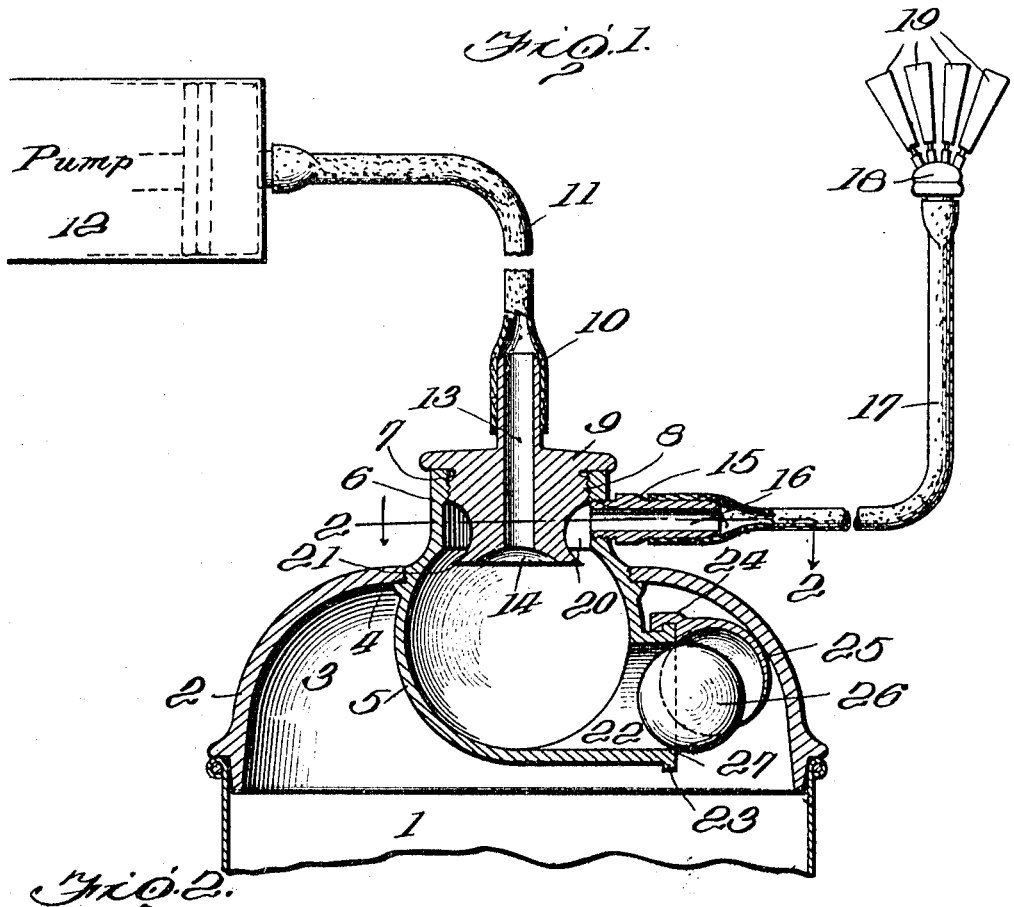
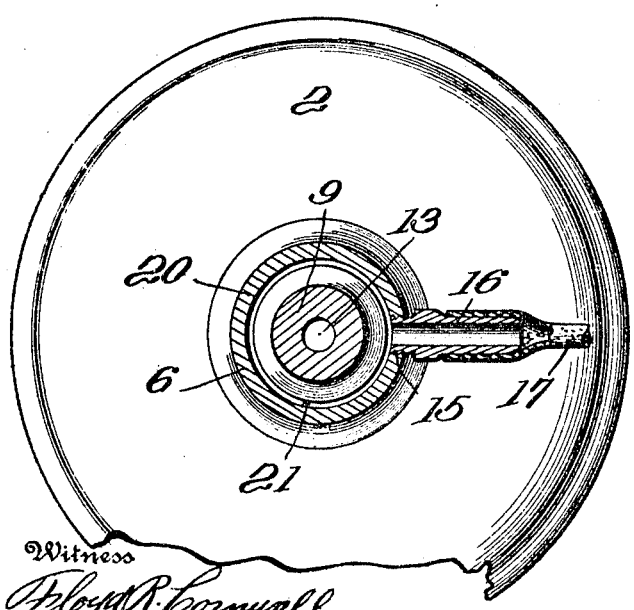
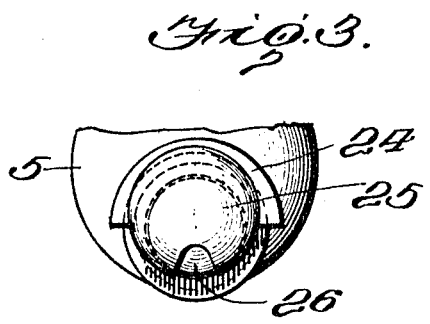
Inventor
G. V. Andrew.
Witness
By
Attorney

UNITED STATES PATENT OFFICE.

GEORGE V. ANDREW, OF HARVARD, ILLINOIS.

MILKING-MACHINE.

1,270,091.  Specification of Letters Patent.  Patented June 18, 1918.

Application filed May 7, 1917. Serial No. 167,050.

*To all whom it may concern:*

Be it known that I, GEORGE V. ANDREW, a citizen of the United States, residing at Harvard, in the county of McHenry and State of Illinois, have invented certain new and useful Improvements in Milking-Machines, of which the following is a specification, reference being had therein to the accompanying drawing.

This invention relates to certain new and useful improvements in milking machines, and more particularly to the vacuum type of machine, the object being to provide a spherical vacuum chamber and a milk receiving chamber formed on curved lines so that the milk entering the receiving chamber will be forced against the inner wall of the spherical vacuum chamber by a spreader in order to allow the milk to run down the sides of the vacuum chamber to the bottom thereof without being drawn up into pump by the air current.

Another object of my invention is to provide a milking machine in which all of the parts are formed on curved lines and so connected together that they can be readily taken apart for cleaning in order to produce a sanitary machine.

Another object of my invention is to provide a spherical vacuum chamber with an outlet in a plane at the bottom thereof having a detachable valve cage in which a ball valve is mounted adapted to close said vacuum chamber by gravity on the suction stroke of the pump for creating a vacuum within the chamber; and to open by the return of the pump stroke when the vacuum is relieved so as to allow the milk to pass out of the vacuum chamber into the receptacle.

I am aware that I am not the first in the art to provide a vacuum chamber with a receiving chamber and with an outlet closed by a valve, but in prior constructions of milking machines of this character the parts were not formed on curved lines, and I have found that by providing a spherical-shaped vacuum chamber having a receiving chamber at its upper end, the walls of which are constructed on an arc of a circle so as to produce an annular chamber terminating in an annular spreader for forcing the milk received in the chamber outwardly against the walls of the vacuum chamber, the same will be delivered at the bottom of the vacuum chamber without being drawn into the pump by the air.

I have also found that by the use of a gravity ball valve which is mounted in a cage and adapted to be seated by the rolling action of the ball that better results can be obtained, as the use of weights or springs are eliminated and the ball valve forms a perfect seat so as to close the vacuum chamber on the suction stroke of the pump.

Other and further objects and advantages of the invention will be hereinafter set forth and the novel features thereof defined by the appended claims.

In the drawings,

Figure 1 is a vertical section through my improved construction of milking machine showing the pump and a portion of the connecting tube and teat cups in elevation;

Fig. 2 is a section taken on line 2—2 of Fig. 1, and

Fig. 3 is a detail elevation of the valve cage and valve of a milk outlet.

Like numerals of reference refer to like parts in the several figures of the drawing.

In the drawing I have shown a receptacle 1 of an ordinary construction over which is arranged an approximately semi-spherical cover member 2 which is provided with a central threaded opening 3 into which is adapted to be screwed the threaded portion 4 of a vacuum chamber 5 which is substantially spherical in shape having a neck portion 6 internally threaded as shown at 7 to receive the externally threaded portion 8 of a head 9 which is provided with an integral nipple 10 to which is adapted to be connected a flexible tube 11 extending from a pump 12. The bore of the nipple 10 registers with a centrally disposed air outlet 13 formed in the head 9, the lower end of which communicates with a concaved recess 14. The neck 6 of the vacuum chamber is provided with a threaded bore 15 in which is secured a threaded nipple 16 carrying a flexible tube 17 which is provided with a head 18 carrying a series of teat cups 19.

The head is annularly reduced on a curved line to form an annular milk receiving chamber 20, the lower portion of said head forming a spreader 21 which is adapted to throw the milk received in the receiving chamber outwardly against the inner wall of the vacuum chamber so as to allow the milk to run down the inner wall without being affected by the air of the vacuum chamber or drawn into the pump.

The lower end of the vacuum chamber is provided with a lateral milk outlet 22 which is annularly flanged as shown at 23 over which is arranged the grooved flange portion 24 of a valve cage 25 constructed as clearly shown in Fig. 3, and in which is loosely mounted a ball valve 26 adapted to be seated on the seat 27 formed on the end of the outlet 22 by the suction within the vacuum chamber and to move off of said seat by the return stroke of the pump when the suction is reduced so as to allow the milk to pass out of the outlet into the receptacle 1.

The valve cage 25 is semi-spherical in shape having its lower wall slotted to provide an outlet and an inclined face for the ball valve 26, which rides up the inclined face on the return stroke of the pump so as to allow the milk which has been drawn into the vacuum chamber to pass out of the milk outlet 22, and on the return stroke of the pump the ball rides down the inclined face by gravity and closes the milk outlet in order to allow a partial vacuum to be produced within the vacuum chamber.

The construction of pump herein shown is adapted to draw air from the vacuum chamber by the movement of the piston in one direction so as to create a partial vacuum therein, and to force air back into the vacuum chamber by the movement of the piston in the opposite direction to relieve the vacuum in order to allow the milk which has been drawn from the teat cups into the vacuum chamber to escape through the outlet, as on each stroke of the piston of the pump the ball valve closes the outlet, and on the return stroke the ball valve is forced off of its seat and allows the milk to flow through the outlet into the receptacle.

From the foregoing description it will be seen that I have provided a milking machine in which all of the parts are constructed on curved lines having an annular milk receiving chamber terminating in a spreader so as to spread the milk away from the air outlet and against the wall of the spherical vacuum chamber which allows the milk to flow freely downwardly over the wall of the vacuum chamber into the bottom thereof without being affected by the air and drawn into the pump, and from which it is discharged by a valve-controlled outlet.

I claim:

1. In a milking machine, a spherical vacuum chamber having a neck, a head detachably mounted in said neck having an annular groove forming an annular milk receiving chamber, the lower end of said neck being provided with an annular spreader for delivering the milk from said receiving chamber to the inner wall of said spherical vacuum chamber, said spherical vacuum chamber being provided with a lateral milk outlet, and a ball valve for closing said outlet.

2. A milking machine, comprising a cover member having a central threaded opening, a substantially spherical member having a threaded portion mounted in said opening, said spherical member having a vertically disposed neck at its upper end, and a laterally disposed milk outlet at its lower end, a ball valve for closing said milk outlet, a head member arranged within said neck having a centrally disposed air outlet and provided with an annular groove forming in conjunction with the neck an annular milk receiving chamber, said neck having a milk inlet, and a spreader formed on the lower end of said head for forcing the milk from said milk receiving chamber outwardly against the inner wall of said spherical vacum chamber.

3. A milking machine, comprising a spherical shaped vacuum chamber, and means for delivering milk into and against the upper portion of the inner wall of said chamber, said vacuum chamber being provided with a laterally disposed milk outlet, a valve cage detachably mounted on said outlet, and a ball valve loosely mounted in said cage having a seat in said outlet.

In testimony whereof I hereunto affix my signature in the presence of two witnesses.

GEORGE V. ANDREW.

Witnesses:
 CHARLES J. VIERCK,
 J. H. CRAWFORD.